(12) United States Patent
Kuo (10) Patent No.: US 6,439,636 B1
(45) Date of Patent: Aug. 27, 2002

(54) VEHICLE ELECTRIC RECLINING SEATS

(76) Inventor: Ming C. Kuo, 19350 Christina Ct., Cerritos, CA (US) 90703

( * ) Notice: Subject to any disclaimer, the term of this patent is extended or adjusted under 35 U.S.C. 154(b) by 0 days.

(21) Appl. No.: 09/778,982

(22) Filed: Feb. 7, 2001

(51) Int. Cl.[7] .............................. B60N 2/02; B60N 2/04
(52) U.S. Cl. ........................ 296/65.09; 296/65.01; 296/65.05; 296/65.09; 296/65.13; 297/354.13; 297/362.11; 297/85
(58) Field of Search ................................ 296/63, 65.01, 296/65.05, 65.09, 65.13, 65.14, 65.18, 67, 68, 69, 75; 297/354.13, 362.11, 330, 85

(56) References Cited

U.S. PATENT DOCUMENTS

| | | | | |
|---|---|---|---|---|
| 3,982,787 A | * | 9/1976 | Moll | 297/317 |
| 4,585,273 A | | 6/1986 | Higgs et al. | |
| 4,619,482 A | | 10/1986 | Itsuki | |
| 4,620,335 A | * | 11/1986 | Dodgen | 5/118 |
| 4,937,900 A | * | 7/1990 | Bridges | 5/37.1 |
| 5,048,886 A | * | 9/1991 | Ito et al. | 296/65.1 |
| 5,123,706 A | | 6/1992 | Granzow | |
| 5,368,355 A | * | 11/1994 | Hayden et al. | 296/65.1 |
| 5,407,166 A | * | 4/1995 | Pilarski | 296/65.1 |
| 5,605,376 A | | 2/1997 | Kogai | |
| 5,772,283 A | | 6/1998 | Yoshida et al. | |
| 5,788,329 A | * | 8/1998 | Pilarczyk et al. | 297/354.13 |
| 5,857,745 A | * | 1/1999 | Matsumiya | 297/354.13 |
| 5,992,798 A | * | 11/1999 | Ferry | 297/354.13 |
| 6,059,345 A | * | 5/2000 | Yokota | 296/65.14 |
| 6,059,364 A | * | 5/2000 | Dryburgh et al. | 297/354.13 |
| 6,237,994 B1 | * | 5/2001 | Bentley et al. | 297/118 |

* cited by examiner

Primary Examiner—Joseph D. Pape
Assistant Examiner—Greg Blankenship
(74) Attorney, Agent, or Firm—Gordon K Anderson (57) ABSTRACT

A set of vehicle electrically actuated reclining seats are provided to replace stationary seats in a van permitting comfortable sleeping. The invention consists of a pair of side walls (30) attached to the van interior, with each side wall including a slotted frame (31) having a horizontal slot (32) therein. A set of rollers (42) on a bench frame (40) interface with the slots permitting the frame to slide horizontally as driven by a first electric motor drive. A pair of seats (60) and back rests (72) are attached to the bench frame, connected to a second electric motor drive such that when the back rest is substantially upright the back of the seat is lower than the front of the seat and when the back rest is pivoted flat the seat is simultaneously raised to a horizontal position parallel to the back rest. A pair of extendible foot rests (94) are connected to the frame adjacent to a seat, and a third electric motor drive is jointly attached to the frame and foot rest to extend the footrest when the back rest and seat is reclined to a fully horizontal position, forming a bed within the van.

18 Claims, 6 Drawing Sheets

VEHICLE ELECTRIC RECLINING SEATS

TECHNICAL FIELD

The present invention relates to vehicle seats in general. More specifically to electrically actuated replacement reclining seats to permit sleeping in a van.

BACKGROUND ART

Previously, many types of vehicle seats have been used in endeavoring to provide comfort to the passenger. In most cases the seats recline, but not sufficiently to lie completely flat, therefore not allowing comfortable sleeping arrangements.

A search of the prior art did not disclose any patents that possess the novelty of the instant invention, however the following U.S. patents are considered related:

| U.S. Pat. No. | Inventor | Issue Date |
|---|---|---|
| 4,585,273 | Higgs et al. | Apr. 29, 1986 |
| 4,619,482 | Itsuki | Oct. 28, 1986 |
| 5,123,706 | Granzow | Jun. 23, 1992 |
| 5,605,376 | Kogai | Feb. 25, 1997 |
| 5,772,283 | Yoshida et al. | Jun. 30, 1998 |

Higgs et al. in U.S. Pat. No. 4,585,273 teaches a vehicle seat frame that is formed of a molded body or a foam, such as polyurethane reinforced internally by a fabricated sheet metal skeleton. The frame is covered by a pad to complete the seat with the back and pan portions structurally independent. Seat belt anchorage's are mounted on the seat back frame rather than to the vehicle body and the arrangement is such that the restraint loads to not pass thorough the seat pan portion of the frame.

U.S. Pat. No. 4,619,482 issued to Itsuki is for a reclining device used for an automobile seat that has a back frame and a cushion frame with the back frame journaled relative to the cushion frame. The device has a cam in the back and in the cushion frame with a second cam engaged by the first cam with a hook for retaining the cam to incline the seat. The seat is therefore adjustable in accordance with the amount of displacement of the cam.

Granzow in U.S. Pat. 5,123,706 discloses an automobile seat that includes a seat frame and a backrest frame each having a pair of oppose side U-shaped braces which face away from the seating surfaces. The side braces of the side frame and back frame portions define open channel like areas for accommodating adjusting units of the seat.

Kogai in U.S. Pat. 5,605,376 teaches a backrest attaching frame for rearward inclination and at the same time is spring loaded toward the attaching frame. A push-up member is vertically attached to a horizontal portion of the backrest attaching member. A seat receiving plate is pivotally supported at the front side of the attaching frame for upward inclination and the seat receiving plate is engaged with an upper end of the push-up member. With this arrangement the backrest side of the seat is upwardly inclined by causing the backrest to be inclined rearwardly.

U.S. Pat. No. 5,772,283 issued to Yoshida et al. is for a tilt-up automobile seat that has a mechanism positioned under the seat cushion. The seat cushion and a seat back are continuously positioned in a flat plane at a predetermined angle and the whole seat is tilted upwards around a front side of the seat cushion as a fulcrum. The mechanism is covered by a combination of an upper cover and a lower cover resulting in the tilt-up mechanism not being seen from the outside. The upper and lower covers may include flange parts overlapped to each other having a predetermined height.

DISCLOSURE OF THE INVENTION

In the past passenger vans, or so called mini-vans, have been popular in this country as they offer increased passenger seating and more useable area inside than conventional passenger automobiles. In most cases the bench seats are removable for hauling large objects and permit aftermarket modification to convert the van into a mini-camper. While these conversions are successful they are usually permanent and therefore complete flexibility of the van is lost.

It is therefore a primary object of the invention to employ a pair of reclining seats mounted within the van that function as conventional automotive seats with reclining capabilities but may be angularly adjusted to lay completely flat creating a comfortable bed. This substitution may be easily made and does not effect the appearance and utility of the van itself An important object of the invention is directed to the physical size of the reclining seats as they are proportioned properly as passenger seats so as to be comfortable in the sitting position but are also sized to be full length beds when reclined flat. This feature is particularly important in the utility of the van as it may be used in the conventional manner as a passenger vehicle but may be altered quickly and easily into a mini-van with sleeping capabilities. This object is specially meaningful to couples that travel and do not want to be subjected to the inconveniences of driving a larger mobile home with its fuel expense and parking difficulties.

Another object of the invention is in the addition of the footrest in front of the seat as passenger comfort is enhanced beyond that of a conventional passenger car seat particularly for long trips. Further the design of the seats permits the rear portion of the seat to be lower than the front and when reclined the seat and backrest follow the natural contour of a persons body by automatically raising the angle of the seat proportionally until the seat and backrest are completely horizontal. It should be noted that most vans do not have electrically operated reclining seats for passengers in the rear as this feature, when available, is usually limited to the front seats.

Still another object of the invention is space utilization within the van interior. The invention actually slides the entire bench frame, to which the seats are attached, to the rear leaving ample space to stretch out the footrest and also to permit room to accomplish other functions when the seats are upright such as eating on a portable table, changing ones clothes etc. Additionally this object permits the seats to be slid forward to the front when added space is required behind the seats for hauling items whenever it is required. Adding to its versatility, when the bench frame is slid to or beyond the second bench position the original first van bench may be positioned within the vehicle captivation slots permitting the van to carry additional passengers as the movable seats do not encroach on this space.

Yet another object of the invention is that the seats are separately adjusted to accommodate the individual preference of the passenger as to the angle of recline and the height of the footrest during a trip. When both seats are lowered flat individual beds may be made up or both may be treated as a double bed with one set of bedding as the seats are relatively close together and yet separated.

A further object of the invention is the use of conventional switching controls which are well known and in common usage in passenger vehicles. As a matter of fact the switches are attached to the electrical system of the van in the accessory circuits which were furnished by the original equipment manufacturer for just that purpose and since the motors and worm gears are the automotive type sufficient power is available in the vans electrical system.

A final object of the invention is the flexibility of the design which is easily adaptable to other configurations such as the preferred embodiment has two separate seat and backrest combinations, however, it could be easily made as a single bench seat with little modification the basic design required. The preferred embodiment presented at this time, has the side walls attached to the sides of the van however the attachment could just as well be made to the floor of the van and interface with the existing connections for the standard bench seats that have been removed to install the invention. This adaptation would permit the entire assembly to be removed in one piece by only disconnecting the power and unlatching the connection in the floor. Again little modification would be required to accomplish this feature.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 15 is a partial isometric view of the bench frame, completely removed from the invention for clarity and viewed from the right front. to FIG. 16 is a partial isometric view of one of the pivot arm shafts completely removed from the invention for clarity.

FIG. 17 is a partial isometric view of one of the back rest frames completely removed from the invention for clarity.

FIG. 18 is a partial isometric view of one of the threaded shafts and bracket that is attached to the side wall completely removed from the invention for clarity.

FIG. 19 is a partial isometric view of one of the seat frames completely removed from the invention for clarity.

FIG. 20 is a partial isometric view of one of the worm gear attaching frame brackets completely removed from the invention for clarity.

FIG. 21 is a partial isometric view of one of the enclosure belt flanged drums completely removed from the invention for clarity.

FIG. 22 is a partial isometric view of one of the foot rest pivot joint yokes completely removed from the invention for clarity.

FIG. 23 is a exploded partial isometric view of one of the rollers which includes the threaded pin and roller body completely removed from the invention for clarity.

FIG. 24 is a partial isometric view of one of the seat and backrest links completely removed from the invention for clarity.

FIG. 25 is a partial isometric view of one of the pivoting nuts completely removed from the invention for clarity.

FIG. 26 is a partial isometric view of one of the footrest pivot joint yokes completely removed from the invention for clarity.

BEST MODE FOR CARRYING OUT THE INVENTION

Figure 1:
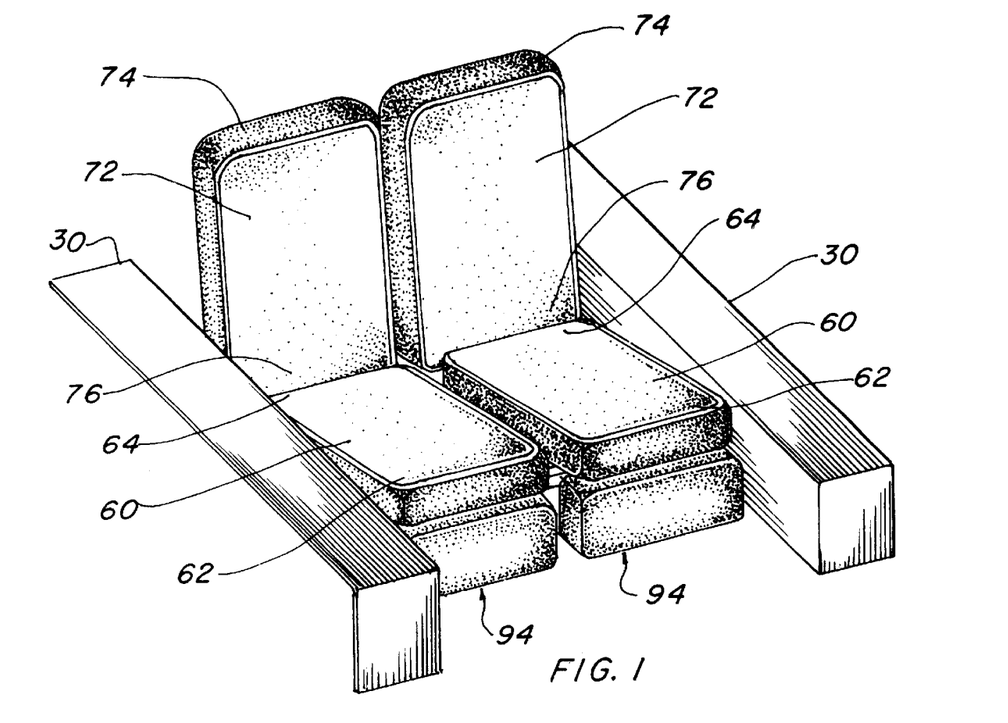
FIG. 1 is a partial isometric view of the preferred embodiment installed in the rear portion of a van behind the drivers seat.
Figure 2:
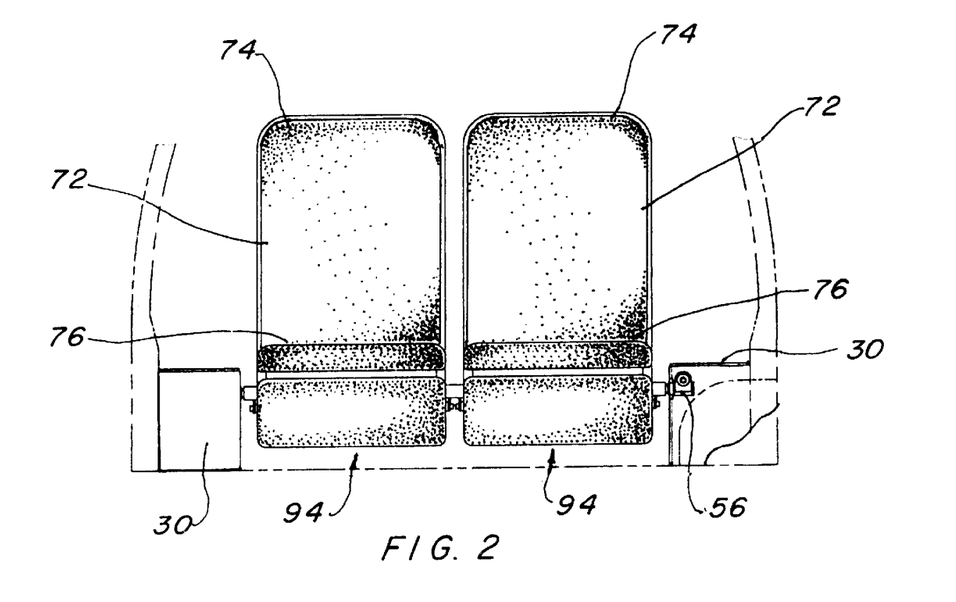
FIG. 2 is a front elevation view of the preferred embodiment installed within a van shown in phantom.

The best mode for carrying out the invention is presented in terms of a preferred embodiment. This preferred embodiment is shown in FIGS. 1 thorough 26 and is comprised of vehicle electrically actuated reclining seats for replacing stationary seats to permit sleeping within a van. A pair of side walls 30 are attached to the van interior, with each side wall 30 having a slotted frame 31 attached thereunto forming a horizontal slot 32 near the top portion of the vertical side. The side walls 30 are preferably fabricated of sheet metal configured to conform with the interior of the van and are formed as a right angle with flanges or ends covering the open front and back. The side walls 30 are shown in FIGS. 1 through 5 and one specifically by itself in FIG. 4. While sheet metal is preferred, other materials may also be used in its construction as long as they have the structural integrity to hold the seats within the slots 32.

Figure 3:
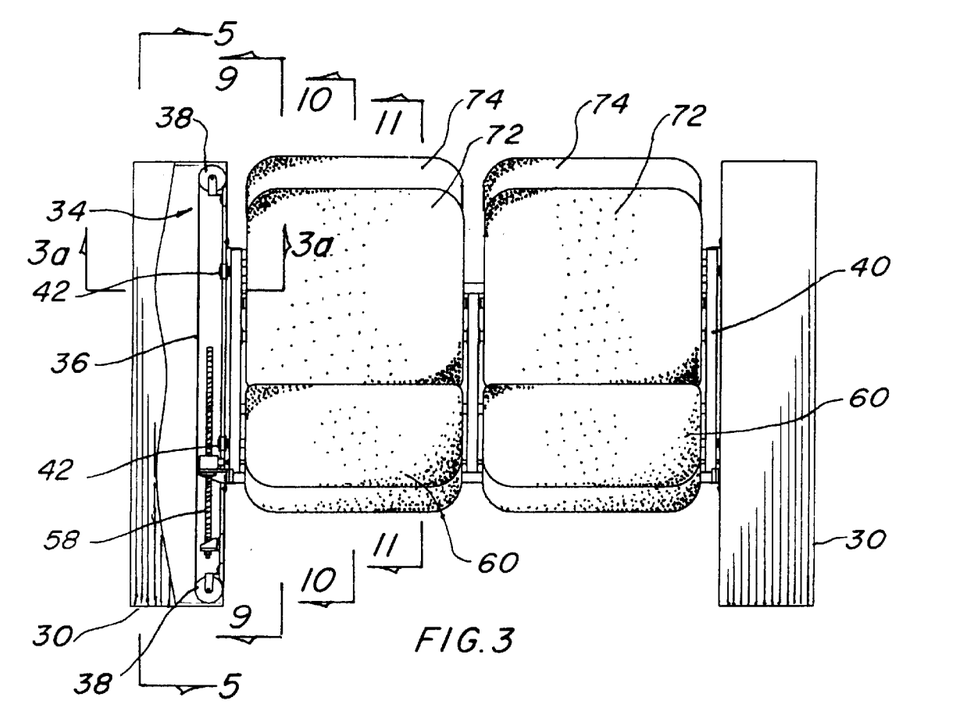
FIG. 3 is a top view of the preferred embodiment installed within a van with one of the side walls cut away to show the stationary flanged rollers and the threaded shaft.
Figures 3A, 4:
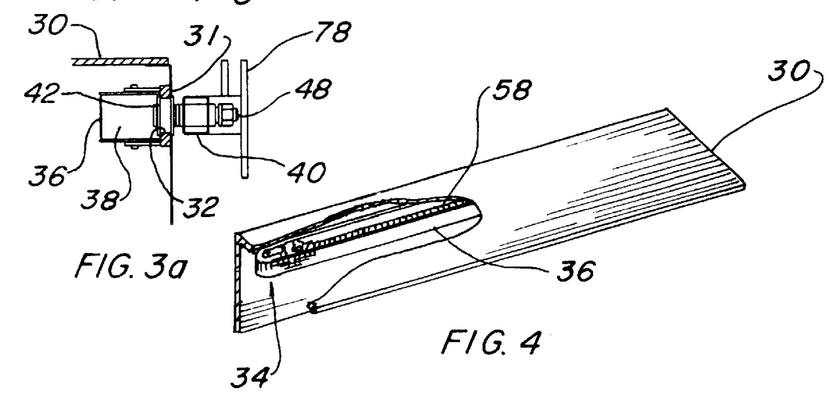
FIG. 4 is a fragmentary isometric view of one of the side walls removed from the invention for clarity.
Figure 5:
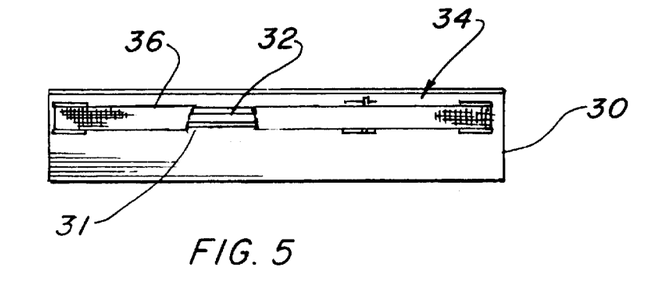
FIG. 5 is a cross sectional view taken along lines 5—5 of FIG. 3.

The side walls 30 also include a enclosure belt slot cover 34 positioned over the slot such that the exposed slot 32 outside the seat is constantly enveloped in all forward and rearward seat positions. The slot cover 34 is shown in FIGS. 3 through 5 and consists of an enclosure belt 36 wrapped around a pair of flanged drums 38 that are bracketed to the side walls 30. The ends of the belt 36 attach to the front and the rear ends of the bench frame 40. The belt 36 may be of any flexible, substance that is also stretchable such as a fabric covered with a thermoplastic material etc. The slot cover 34 acts as a safety device to cover and protect the slot 32 from entry of foreign objects and to eliminate human intervention that may prove injurious.

A bench frame 40, that includes a plurality of rollers 42 that extend from each side, is positioned between the side walls 30 with the rollers 42 disposed within each slot 32 such that the frame 40 may horizontally glide on the rollers 42 through the slots 32, as illustrated in FIG. 3, forming the means to attach the bench frame 40 to each side wall 30. The bench frame 40 is essentially constructed of thin wall rectangular tubing as shown in FIGS. 6 through 8 and 15 and contains a number of integral brackets for attaching seats, backs, footrests and drives.

Figure 6:
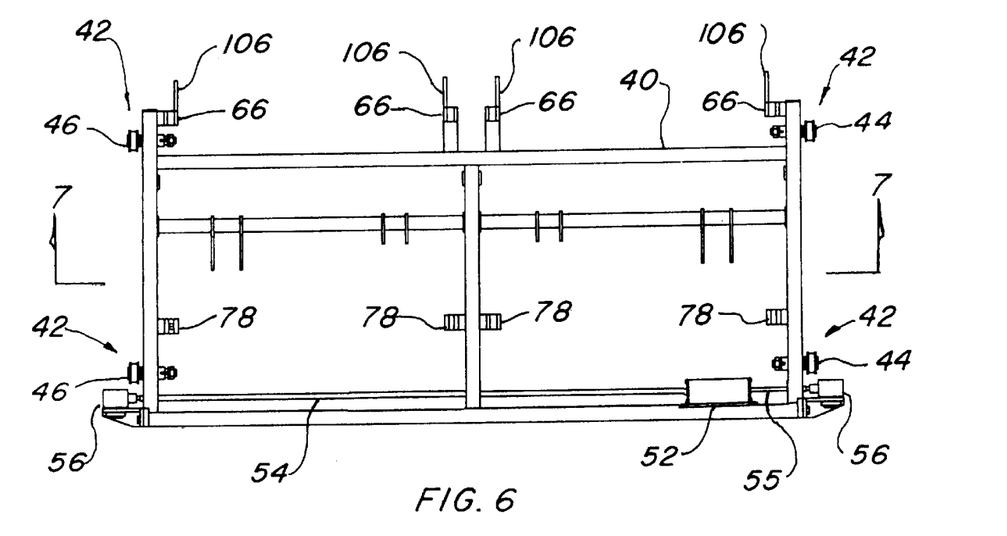
FIG. 6 is a plan view of the bench frame completely removed from the invention, with the front of the frame facing upward.
Figure 7:
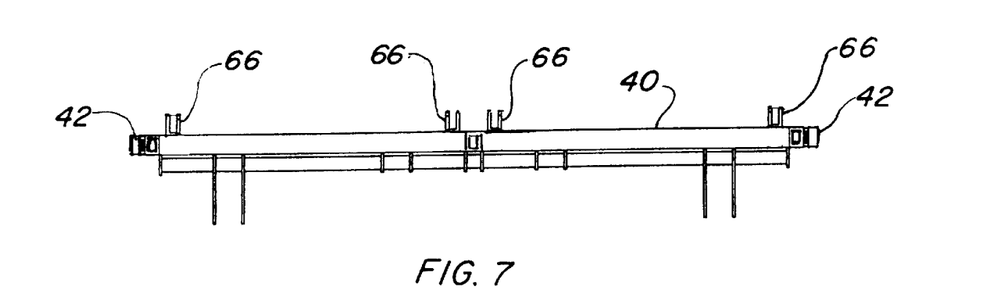
FIG. 7 is a cross sectional view taken along lines 7—7 of FIG. 6.
Figure 8:
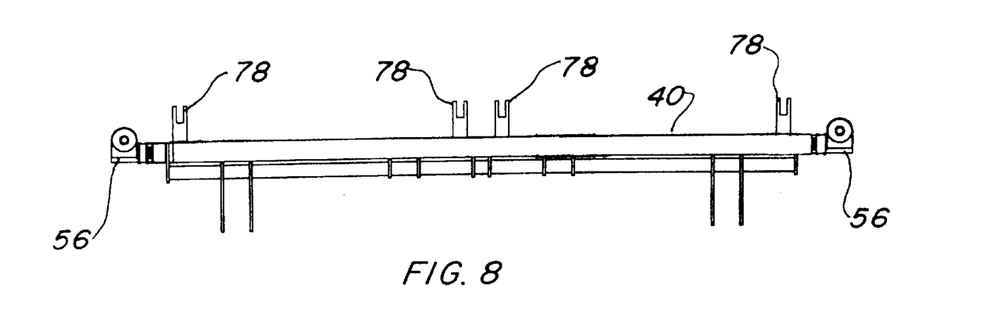
FIG. 8 is a rear elevation view of the bench frame completely removed from the invention for clarity.
Figure 9:
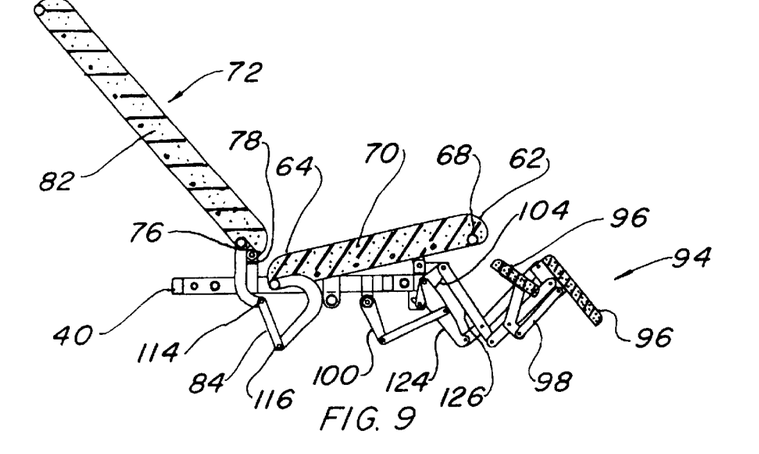
FIG. 9 is a cross sectional view taken along lines 9—9 of FIG. 3.
Figure 10:
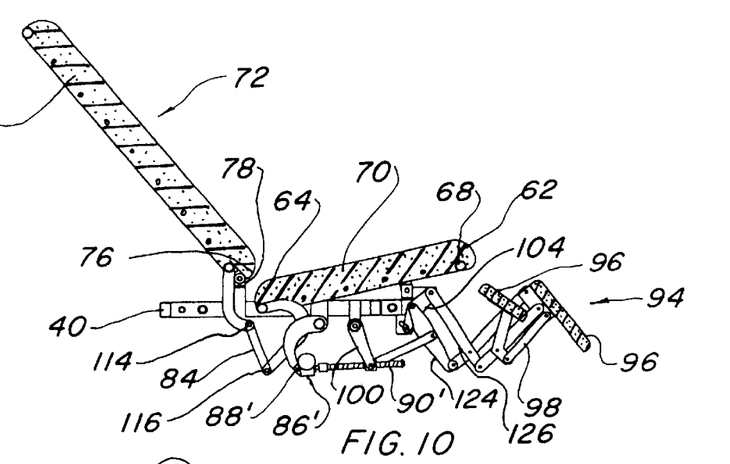
FIG. 10 is a cross sectional view taken along lines 10—10 of FIG. 3.
Figure 11:
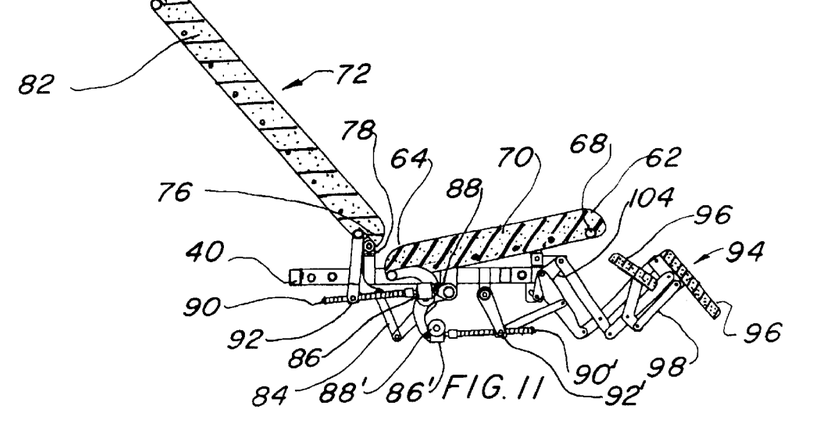
FIG. 11 is a cross sectional view taken along lines 11—11 of FIG. 3.

The plurality of rollers 42 consist a pair of stationary shaft flanged rollers 44 on the van curb side for captivation within a side wall 30 and a pair of floating flanged rollers 46 on said van road side. The purpose of two separate types of rollers is to permit the floating rollers 46 slip laterally to overcome misalignment and to eliminate binding of the bench frame 40 on the side walls 30 when shifting forward and rearward within the slots 32 of the side walls. The arrangement is illustrated in FIG. 6, with a individual threaded pin 48 and roller body 50 by themselves in FIG. 23, it should be noted that the stationary and floating rollers 44 and 46 are similar in construction with the difference in length of the threaded pin 48 to allow lateral movement in the floating configuration. Further the stationary rollers 44 and floating rollers 46 may be positioned on either the road side or curb side of the vehicle without differentiation. The roller body 50 on each roller 42 may be replaced by a rectangular block having flanges along its longitudinal edges to slide within the slot 32 and be confined on the edges instead of rotating. In this approach the sliding block creates more friction that a rotating roller but it has longer base and flange engagement to withstand the load. Particularly if the sliding block is made of a low friction material it may be a viable alternative.

A first electric motor drive is attached to both the bench frame 40 and the side walls 30 for moving the bench frame 40 forward and rearward within the van. The first electric motor drive consists of a motor 52 attached inside the bench frame 40, as shown in FIG. 6, with a rigid tubular shaft 54 connected on one end of the motor 52 and a flexible shaft 55 connected on the other end. A worm gear 56 and gear attaching frame bracket 57 is rotatably connected to each tubular shaft 54 and flexible shaft 55. The drive also includes a first drive threaded shaft 58 that is fixably attached to each side wall 30 with the worm gear 56 disposed upon the threaded shaft 58 such that when the motor 52 is actuated each of the drive shafts 54 and 55 rotate the worm gears 56 and propel the bench frame 40 linearly along the threaded shafts 58. The worm gear 56 is similar to a passenger vehicle seat adjuster except it includes a threaded hole through its gear that engages the threaded shaft 58.

Figure 12:
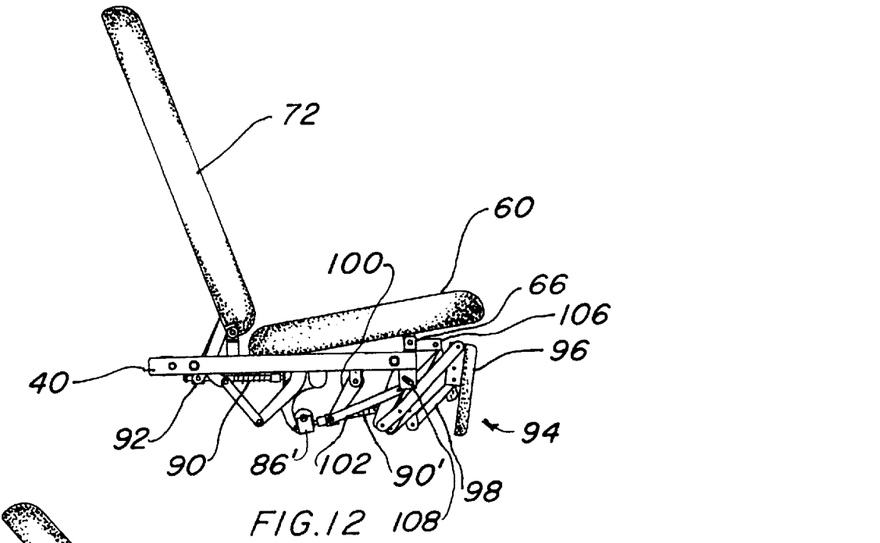
FIG. 12 is a side elevational view of the seat and backrest attached to the bench frame, illustrating the seat adjusted in the upright position.
Figure 13:
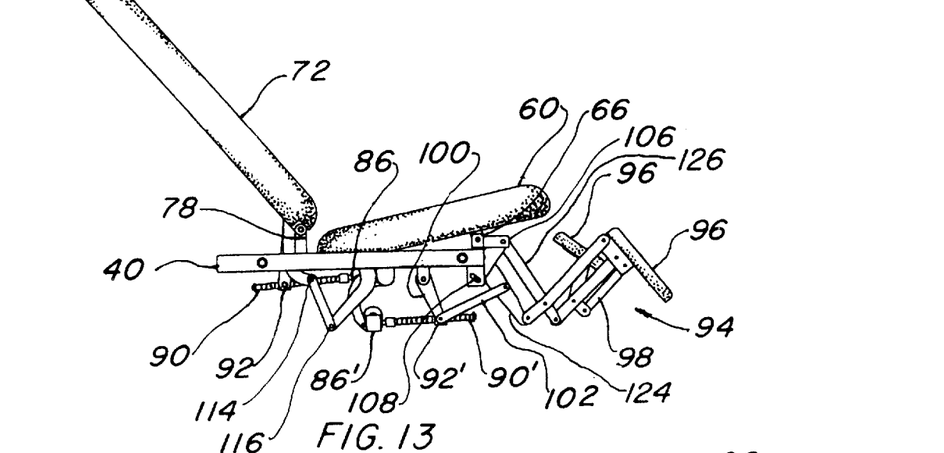
FIG. 13 is a side elevational view of the seat and backrest attached to the bench frame, illustrating the seat adjusted in the intermediate position.
Figure 14:
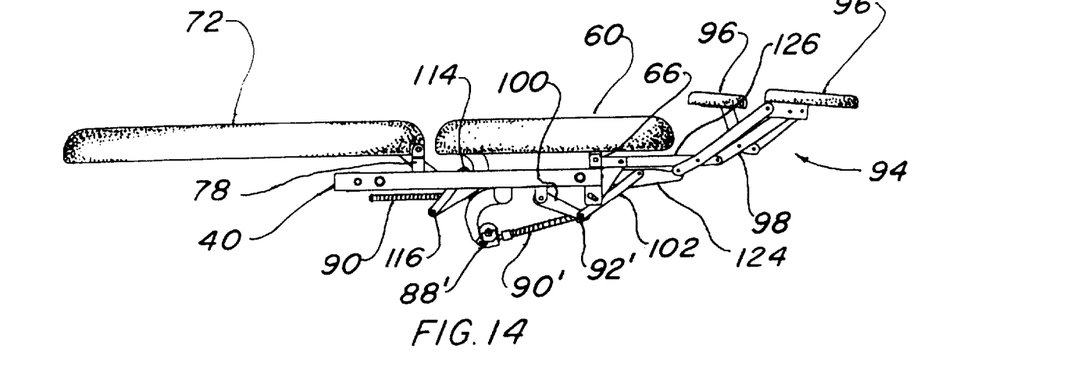
FIG. 14 is a side elevational view of the seat and backrest attached to the bench frame, illustrating the seat adjusted in the fully reclining position forming the seat into a bed.

A pair of seats 60, that embody a front 62 and a back 64, are hingeably attached on the seat front 62 to the bench frame seat brackets 66 as shown in FIGS. 9 through 14. The seats 60 are of conventional construction with a metallic tubular frame 68 with cushioning 70 in the form of wireform springs, foam cushion and a covering of material on the outside. This arrangement permits the seat 60 to pivot from the hinge point which raises the front 62 slightly when the back 64 is lowered as shown in FIGS. 12 through 14 since the pivot point is a short distance to the rear of the front. The frame 68 has a pair of seat arms 112 each having a connecting point 116 in the form of a hole. Each arm 112 extends below the seat back 64 as shown in FIG. 19.

Figures 15, 16, 17, 18, 20, 21, 22, 23, 24, 25, 26:
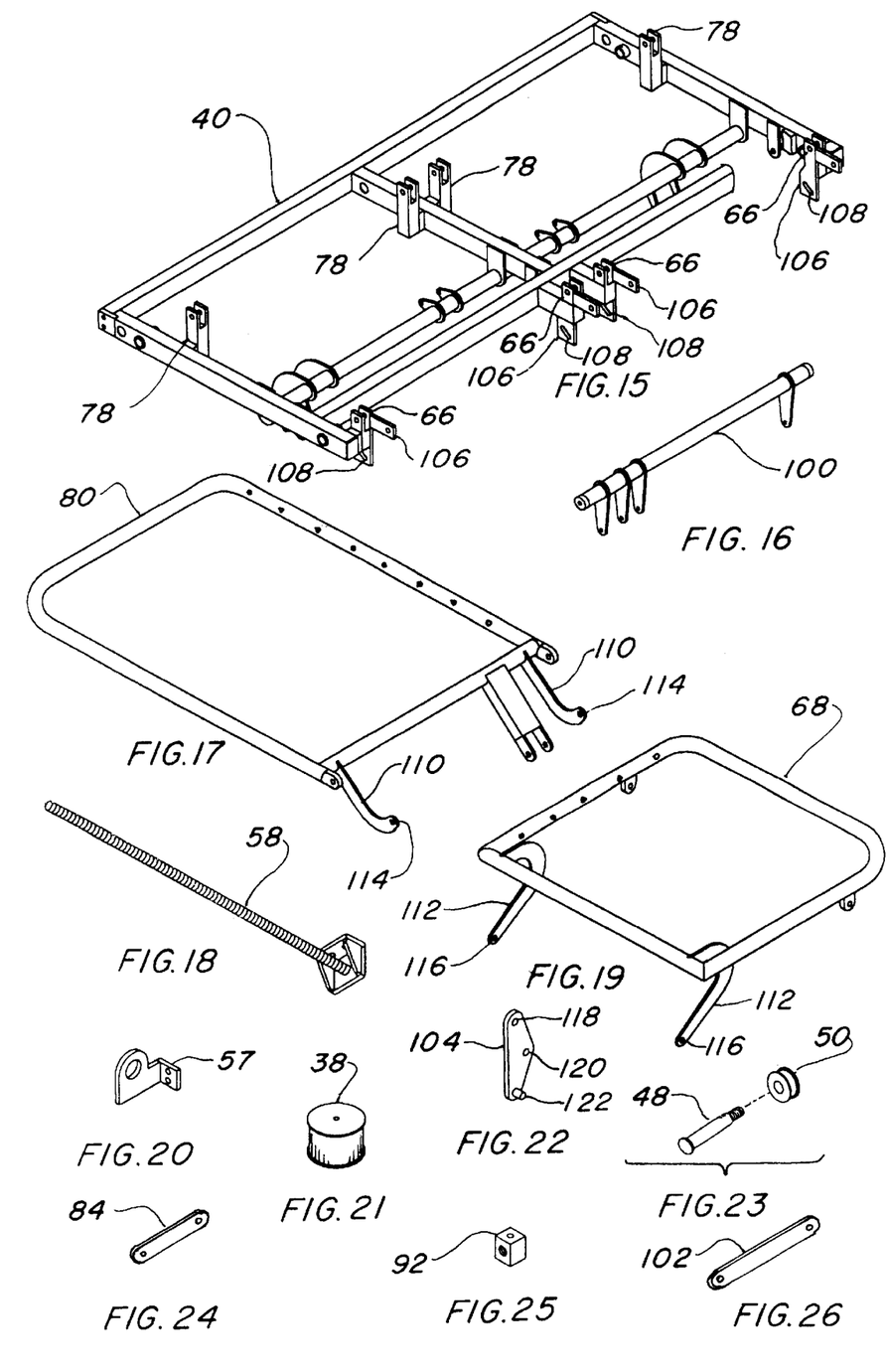

A pair of reclining back rests 72, that have a top 74 and a bottom 76, are arcuately attached on the bottom 76 to the bench frame back rest brackets 78 as shown in FIGS. 9 through 14. The back rests 72 are of conventional construction having a metallic tubular frame 80 with cushioning 82 in the form of wireform springs, foam cushion and a covering of material on the outside. This arrangement permits the back rest 72 to pivot from the hinge point essentially 90 degrees from totally upright to completely horizontal. The frame 80 has a pair of back rests arms 110 each having a connecting point. in the form of a note. The back rest arms 110 extend below the backrest bottom 76 as shown in FIG. 17.

Second electric motor drives are interconnected with each back rest 72. The back rest bottom 76 is connected to the seat back 64 with a pair of seat and backrest links 84 at the seat arm connecting points 116 and the backrest arm connecting points 114. The preferred position of the connecting point 114 on each arm 110 is beneath and close to the seat back 64 with adequate clearance and the connecting point 116 of each seat arm 112 is below and behind the connecting point 114 when both the back rest 72 and the seat 60 are in the horizontal position as shown in FIG. 14. The length of the link 84 is preferably equal to the distance from the connecting points 114 to the hinge point attaching the backrest 72 on the back rest bracket 78 when viewed from the side as shown in FIGS. 9 through 14. It could be desirable to select the locations of the connecting points 114 and 116 such that the seat back is allowed to tilt to its lowest position when the back rest 72 is about 45 degrees in a vertical position, as shown in FIG. 13. There are other methods to connect the seat back 64 to the back rest bottom 76 that would accomplish the same purpose. As an example, the connecting point 114 on the back rest arm 110 could have a roller engaging a slot in the seat arm 112, however it has been found that roller slot engagement has not proven to be a reliable connection for use in a vehicle. When the back rest 72 is substantially upright the back 64 of each seat 60 is lower than its front 62. When each back rest 72 is pivoted flat the corresponding seat 60 is simultaneously raised to a horizontal position parallel with its back rest 72. The above motor drive then forms the means to rotate both the seat 60 and back rest 72 at the same time. This second electric motor drive consists of a worm gear 86 that is rotatably coupled directly to a motor 88, as shown in FIGS. 9 through 14, and connected to a second drive threaded shaft 90 that is disposed within the worm gear 86. A pivoting nut 92 is attached to the threaded shaft 90 and also the back rest bottom 76 to facilitate the function described above such that both the back rest 72 and the seat 60 pivot simultaneously through the seat and back rest link 84. The electric motor 88 and connected worm gear 86 are specifically a passenger vehicle seat adjuster motor and gear type that operate on vehicle electrical power.

Two sets of extendible foot rests 94 are connected to the frame 40 adjacent to the each seat front 62, as shown in FIGS. 9 through 14, and are preferably a commercially obtainable reclining rocker foot rest assembly such as manufactured by Liggett and Platt Inc. under there trade name Concept Rocker, Model Number 8623-B. Each set of extendible foot rests 94 consist of pair of scissors brackets 98 and a pair of cushioned pads 96 supported by the brackets 98. It should be realized however, that this specific model or manufacturer is not obligatory as any substitute foot rest may be used with equal ease and dispatch.

A pair of third electric motor drives are jointly attached to the frame 40 and foot rests 94 for extending individual footrests 94 when each corresponding back rest 72 is reclined to a fully horizontal position and the back of its seat 60 is horizontal, forming a bed within a van permitting a person to sleep thereon. The third electric motor drive is almost identical to the second motor drive and consists of a worm gear 86' that is rotatably coupled directly to a motor 88', as shown in FIGS. 9 through 14, and connected to a third drive threaded shaft 90' that is disposed within the worm gear 86'. A pivoting nut 92' is attached to the threaded shaft 90' and also to a pivot arm shaft 100 which is additionally connected to a pair of foot rest links 102. It should be noted that a foot rest pivot joint yoke 104, shown by itself in FIG. 22, is attached both the frame 40 on a yoke bracket 106 on the frame 40 and foot rest 94 using a pin in the yoke 104 intersecting with a slot 108 in the frame 40 to complete the attachment of the foot rest 94 to the frame 40.

It should be noted that the foot rest pivot joint yoke 104 is used to support each scissor bracket 98 on the frame 40. The yoke 104, illustrated separately in FIG. 22, incorporates a first hole 118, a second hole 120 and a stop pin 122. The yoke 104 connects at the first hole 118 to the yoke bracket 106 on the bench frame 40 with the stop pin 122 engaging the slot 108 in the bench frame 40. The upper end of a first rearmost link 124 of the scissor bracket 98 is connected through the second hole 120 in the foot rest pivot yoke 104. The upper end of a second rearmost link 126 of the scissor bracket 98 is jointly connected through the first hole 118 of the yoke bracket and to the yoke bracket 106 on the bench frame 40. This attachment arrangement permits the foot rest 94 to swing upward further that it could if it were mounted directly to the bench frame 40 and allows the foot rest 94 to be raised high enough for sitting comfort as well as forming the lower part of the bed. The increase of the swing is dependent upon the length of the slot 108, and the slot may therefore be sized to the achieve the most beneficial position for the foot rest 94. It will be understood that the foot rest link 102 connects to the first rearmost link 124 to raise the entire footrest 94. When the motor 88' is energized the third drive threaded shaft 90' is rotated by the worm gear 86' interfacing with the pivoting nut 92' attached to the pivot arm shaft 100 which in turn pivots changing the rotational arc to a linear movement to extend individual footrests to form a bed or for comfort of the passenger when used as a chair. The electric motor 88' and connected worm gear 86' consist of a conventional passenger vehicle seat adjuster motor and worm gear that operate on vehicle electrical power.

The first, second and third motor drives have been described in detail however nothing has been disclosed regarding its control since the switching arrangement is the conventional type used in passenger automobiles, and the like, and as such is well known in the art and subsequently requires no detailed description of its structure and function. Likewise the connection to the vehicles electrical system is found in all vans of the type described for use with the invention which already have an auxiliary system intended for use with additional electric equipment within the vehicle.

The preferred embodiment describes a set of two separate seats with individual control however it is the intent of the invention to utilize the same system with a bench seat having a single seat and backrest which only require one second and third electric motor drive with all of the other elements substantially the same in structure and function. It is also anticipated that the side walls 30 could easily be attached to the floor of the van making the entire invention removable with little change in the structure, further for economy, the first electric motor drive may be easily eliminated.

While the invention has been described in complete detail and pictorially shown in the accompanying drawings it is not to be limited to such details, since many changes and modifications may be made to the invention without departing from the spirit and scope thereof Hence, it is described to cover any and all modifications and forms which may come within the language and scope of the appended claims.

What is claimed is:

1. Vehicle electrically actuated reclining seats for replacing stationary seats achieving seating comfort and to permit sleeping within a van comprising:
   a pair of side walls attached to a van interior, with each side wall having a horizontal slot therein,
   a bench frame having a plurality of rollers extending therefrom, with the rollers disposed within each horizontal slot such that the frame may horizontally glide on the rollers through the slots,
   a first electric motor drive attached to both the bench frame and the side walls for moving the bench frame forward and rearward within the van,
   a pair of seats having a front and a back with each seat front hingeably attached to said bench frame,
   a pair of reclining back rests each having a top and a bottom with each bottom arcuately attached to the frame,
   a pair of second electric motor drives each interconnected with a seat back and also the bottom of its corresponding back rest such that when each back rest is substantially upright the back of each seat is lower than its front and when each back rest is pivoted flat by the second electric motor drive the corresponding seat is simultaneously raised to a horizontal position parallel with its back rest,
   a pair of extendible foot rests each connected to the frame adjacent to the front of each seat, and
   a pair of third electric motor drives each jointly attached to the frame and each extendible foot rest for extending individual footrests when each corresponding back rest is reclined to a fully horizontal position and the back of its seat is horizontal, forming a bed within a van permitting a person to sleep thereon.

2. The vehicle electrically actuated reclining seats as recited in claim 1 wherein said pair of side walls are fabricated of sheet metal configured to conform with the interior of the van.

3. The vehicle electrically actuated reclining seats as recited in claim 1 wherein each pair of side walls further comprise an enclosure belt slot cover positioned over the slot such that the exposed slot outside the seat is constantly enveloped in all forward and rearward seat positions.

4. The vehicle electrically actuated reclining seats as recited in claim 1 wherein said bench frame is essentially constructed of thin wall rectangular tubing.

5. The vehicle electrically actuated reclining seats as recited in claim 1 wherein said plurality of rollers further comprise a pair of stationary shaft flanged rollers on said van curb side for captivation within a side wall and a pair of floating flanged rollers on said van road side, said floating rollers slip laterally to overcome misalignment and to eliminate binding of the bench frame on the side walls when shifting forward and rearward within the slots of the side walls.

6. The vehicle electrically actuated reclining seats as recited in claim 1 wherein said first electric motor drive further comprising,
   a motor attached to the bench frame,
   a drive shaft connected on each end of the motor,
   a worm gear rotatably connected to each drive shaft, and
   a first drive threaded shaft fixably attached to each side wall, with the worm gear disposed upon the threaded shaft, such that when the motor is actuated the drive shaft rotates the worm gear and propels the bench frame linearly along the first drive threaded shaft.

7. The vehicle electrically actuated reclining seats as recited in claim 6 wherein said electric motor and worm gear further comprises a passenger vehicle seat adjuster operating on vehicle electrical power.

8. The vehicle electrically actuated reclining seats as recited in claim 1 wherein each of the pair of seats and the back rests further comprise a metallic tubular frame having cushioning with covering disposed thereon.

9. The vehicle electrically actuated reclining seats as recited in claim 1 wherein said second electric motor drive further comprises,
  a worm gear rotatably coupled to said motor,
  a second drive threaded shaft disposed within the worm gear, and
  a pivoting nut threadably attached to the second drive threaded shaft and also to both the seat back and the bottom of the back rest to facilitate said function that when each back rest is substantially upright the back of each seat is lower than its front and when each back rest is pivoted flat by the second electric motor drive the corresponding seat is simultaneously raised to a horizontal position parallel with its back rest.

10. The vehicle electrically actuated reclining seats as recited in claim 9 wherein said electric motor and said worm gear further comprise a passenger vehicle seat adjuster motor and worm gear respectively, with the motor operating on vehicle electrical power.

11. The vehicle electrically actuated reclining seats as recited in claim 1 further comprising,
  a plurality of seat and backrest links, each having a backrest arm connecting point and a seat arm connecting point,
  a plurality of seat and backrest links,
    wherein said back rest bottom is connected to the seat back with the seat and backrest links at the seat arm connecting points and the backrest arm connecting points, the connecting point locations permit the seat back to tilt to a lowest position when the back rest is substantially 45 degrees from a vertical position.

12. The vehicle electrically actuated reclining seats as recited in claim 1 wherein said each extendible foot rest further comprises a commercially obtainable reclining rocker foot rest assembly.

13. The vehicle electrically actuated reclining seats as recited in claim 1 wherein said extendible foot rests further comprise a pair of cushioned pads attached together with a plurality of scissor brackets each having cushioning enclosed with a covering.

14. The vehicle electrically actuated reclining seats as recited in claim 13 wherein said extendible foot rests further comprise,
  each scissor bracket having a upper end of a first rearmost link and a upper end of a second rearmost link,
  at least one foot rest pivot joint yoke in communication with the scissor bracket with the yoke having a first hole, a second hole and a stop pin therein,
  said bench frame having a bracket slot therein, and
  a plurality of yoke brackets attached to the bench frame,
    wherein the foot rest pivot joint yoke connects the first hole to the yoke bracket on the bench frame with the stop pin engaging the slot in the bench frame, the upper end of the first rearmost link of the scissor bracket is connected through the second hole in the foot rest pivot yoke and the upper end of the second rearmost link of the scissor bracket is jointly connected through the first hole of the yoke bracket and to the yoke bracket on the bench frame, this attachment arrangement permits the foot rest to swing upward further that it could if it were mounted directly to the bench frame and allows the foot rest to be raised high enough for sitting comfort as well as forming the lower part of the bed.

15. The vehicle electrically actuated reclining seats as recited in claim 1 wherein said third electric motor drive further comprises,
  a worm gear rotatably coupled to each motor,
  a third drive threaded shaft disposed within the worm gear, and
  a pivoting nut threadably attached to the third drive threaded shaft and also to each extendable foot rest to facilitate said function of extending individual footrests for sitting comfort and also when each corresponding back rest is reclined to a fully horizontal position and the back of its seat is horizontal, forming a bed within a van permitting a person to sleep thereon.

16. The vehicle electrically actuated reclining seats as recited in claim 15 wherein said electric motor and said worm gear further comprise a passenger vehicle seat adjuster motor and worm gear respectively, with the motor operating on vehicle electrical power.

17. Vehicle electrically actuated reclining seats for replacing stationary seats achieving seating comfort and to permit sleeping within a van comprising:
  a pair of side walls attached to a van interior, with each side wall having a horizontal slot therein,
  a bench frame having roller means interfacing with each slot such that the frame may move horizontally through the slots,
  a first electric motor drive attached to both the bench frame and the side walls for moving the bench frame forward and rearward within the van,
  at least one seat attached to said bench frame,
  at least one reclining back rest attached to the frame,
  at least one second electric motor drive connected to both a seat and a back rest such that when the back rest is substantially upright a back portion of the seat is lower than a front portion of the seat and when the back rest is pivoted flat by the second electric motor drive the seat is simultaneously raised to a horizontal position parallel to the back rest,
  at least one extendible foot rests connected to the frame adjacent to a seat, and
  at least one third electric motor drives jointly attached to the frame and extendible foot rest for extending the footrest for sitting comfort and when each back rest is reclined to a fully horizontal position and the seat is horizontal, forming a bed within a van permitting a person to sleep thereon.

18. Vehicle electrically actuated reclining seats for replacing stationary seats in a van interior comprising:
  a pair of side walls attached onto a van interior,
  a bench frame horizontally gliding upon each side wall, means for glideably attaching the bench frame to each side wall,
  at least one seat attached to said bench frame,
  at least one reclining back rest attached to the frame,
  means to rotate the seat and back rest such that when the back rest is substantially upright a back portion of the seat is lower than a front portion of the seat and when the back rest is flat the seat is simultaneously raised to a horizontal position parallel with the back rest, an extendible foot rest connected to the frame adjacent to the seat, and foot rest extending means, for elongating the footrest to form a bed.

* * * * *